United States Patent
Zhou et al.

(10) Patent No.: US 11,913,808 B2
(45) Date of Patent: Feb. 27, 2024

(54) INERTIAL SENSOR AND METHOD OF INERTIAL SENSING WITH TUNEABLE MODE COUPLING STRENGTH

(71) Applicant: Cambridge Enterprise Limited, Cambridge Cambridgeshire (GB)

(72) Inventors: Xin Zhou, Changsha Hunan (CN); Chun Zhao, Wuhan Hubei (CN); Ashwin A. Seshia, Cambridge (GB)

(73) Assignee: SILICON MICROGRAVITY LIMITED, Cambridge (GB)

( * ) Notice: Subject to any disclaimer, the term of this patent is extended or adjusted under 35 U.S.C. 154(b) by 526 days.

(21) Appl. No.: 17/276,683

(22) PCT Filed: Sep. 16, 2019

(86) PCT No.: PCT/GB2019/052600
§ 371 (c)(1),
(2) Date: Mar. 16, 2021

(87) PCT Pub. No.: WO2020/058688
PCT Pub. Date: Mar. 26, 2020

(65) Prior Publication Data
US 2021/0270608 A1    Sep. 2, 2021

(30) Foreign Application Priority Data
Sep. 18, 2018 (GB) .................. 1815199

(51) Int. Cl.
*G01P 15/097*    (2006.01)
*G01C 19/56*    (2012.01)
(Continued)

(52) U.S. Cl.
CPC .......... *G01C 25/005* (2013.01); *G01P 15/097* (2013.01); *G01P 21/00* (2013.01);
(Continued)

(58) Field of Classification Search
CPC .............. G01C 25/005; G01C 19/5755; G01C 19/5726; G01C 19/56; G01P 15/097;
(Continued)

(56) References Cited

U.S. PATENT DOCUMENTS 5,760,304 A    6/1998 Lynch
2005/0161749 A1*    7/2005 Yang .................... H03H 9/2463
257/414

(Continued)

FOREIGN PATENT DOCUMENTS

EP    1914512 A2    4/2008
EP    2577324       4/2013
(Continued)

OTHER PUBLICATIONS

Paredes Sanchez, Luis-Miguel, International Search Report and Written Opinion, PCT/GB2019/052600, dated Dec. 5, 2019, 17 pages.
(Continued)

*Primary Examiner* — Alessandro V Amari
*Assistant Examiner* — Christian T Bryant
(74) *Attorney, Agent, or Firm* — Maynard Nexsen PC; Todd Allen Serbin (57) ABSTRACT

There is provided an inertial sensor comprising a frame, a resonator assembly fixed to the frame comprising a first and second resonator coupled to one another by a mechanical coupling and a drive means coupled to the resonator assembly for driving the first and second resonators to vibrate. The resonator assembly is configured such that energy is transferred between the first and second resonators through the mechanical coupling. An amount of energy transferred through the mechanical coupling is dependent on the value of an input measurand acting on one of the first and second resonators. The inertial sensor also comprises a pumping (Continued)

means coupled to the resonator assembly for applying a pumping signal to the resonator assembly, the pumping means controlled by electrical circuitry, and a sensor assembly configured to detect the amplitude of oscillation of the first resonator at a first resonant frequency and the amplitude of oscillation of the second resonator at a second resonant frequency. The electrical circuitry is configured to control the pumping means to apply a pumping signal that has a frequency substantially equal to a difference between the first resonant frequency and the second resonant frequency. When the input measurand has the first value, the signal from the pumping means adjusts an amplitude ratio of the amplitudes of oscillation of the first and second resonator detected by the sensor assembly so that the amplitude ratio is within a predetermined amplitude ratio range over an expected range of input measurand values. An output of the inertial sensor is based on the amplitude ratio.

23 Claims, 7 Drawing Sheets

(51) Int. Cl.
| | | |
|---|---|---|
| *G01C 19/5726* | (2012.01) | |
| *G01C 19/5755* | (2012.01) | |
| *G01C 25/00* | (2006.01) | |
| *G01P 15/125* | (2006.01) | |
| *G01P 21/00* | (2006.01) | |
| *G05D 19/02* | (2006.01) | |
| *G01P 15/08* | (2006.01) | |

(52) U.S. Cl.
CPC ......... *G01C 19/56* (2013.01); *G01C 19/5726* (2013.01); *G01C 19/5755* (2013.01); *G01P 2015/0814* (2013.01); *G01P 15/125* (2013.01); *G05D 19/02* (2013.01)

(58) Field of Classification Search
CPC ............. G01P 21/00; G01P 2015/0814; G01P 15/125; G05D 19/02
See application file for complete search history.

(56) References Cited

U.S. PATENT DOCUMENTS

| | | | |
|---|---|---|---|
| 2013/0298675 A1* | 11/2013 | Thiruvenkatanathan | .................... G01P 15/18 73/504.16 |
| 2015/0268262 A1* | 9/2015 | Rombach | .................. G01P 1/04 73/504.12 |
| 2015/0354959 A1* | 12/2015 | Senkal | ............... G01C 19/5684 73/504.13 |
| 2018/0274921 A1 | 9/2018 | Matsukawa | |
| 2019/0020308 A1* | 1/2019 | Collin | .................. G01N 29/346 |
| 2019/0360808 A1* | 11/2019 | Seshia | ................ G01C 19/5684 |

FOREIGN PATENT DOCUMENTS

| | | |
|---|---|---|
| WO | 2011148137 A1 | 12/2011 |
| WO | 2018138529 A2 | 8/2018 |

OTHER PUBLICATIONS

Cannon, Ralph, GB Search Report, GB1815199.3, dated Jan. 24, 2019, 4 pages.
Thiruvenkatanathan, et al., Ultrasensitive mode-localized micromechanical electrometer, Jun. 1, 2010, 6 pages.
Zhang, et al., A Novel Scale Factor Calibration Method for a MEMS Gyroscope Based on Virtual Coriolis Force, 10th IEEE Internat'l Conference, Apr. 2015, 3 pages.
Okamoto, H., "Coherent phonon manipulation in coupled mechanical resonators," Nature Physics, vol. 9, Aug. 2013, www.nature.com/naturephysics, 6 pages.
Okamoto, H., "Coherent phonon manipulation in coupled mechanical resonators," Supplementary Information, Nature Physics, www.nature.com/naturephysics, 12 pages.
Etienne-Nickitas, Athina, International Preliminary Report on Patentability, PCT/GB2019/052600, dated Mar. 23, 2021, 10 pages.

\* cited by examiner

Figure 9 a) Drive mode     b) Sense mode

Figure 10

INERTIAL SENSOR AND METHOD OF INERTIAL SENSING WITH TUNEABLE MODE COUPLING STRENGTH

CROSS REFERENCE TO RELATED APPLICATIONS

This application is a 35 U.S.C. § 371 U.S. national phase entry of International Application No. PCT/GB2019/052600 having an international filing date of Sep. 16, 2019, which claims the benefit of GB patent application no. 1815199.3, filed Sep. 18, 2018, both of which are incorporated herein by reference in their entirety.

FIELD OF THE INVENTION

The present invention relates to inertial sensors and methods of inertial sensing and particularly to inertial sensors and methods of inertial sensing based on measuring changes in mode localization.

BACKGROUND TO THE INVENTION

Accelerometers and gyroscopes are in wide use today for a variety of motion sensing applications ranging from inertial navigation to vibration monitoring. Accelerometers measure changes in acceleration (linear or rotational) while gyroscopes provide information about angular motion (rotation). These devices use the inertial properties of light or matter for their operation and have hence been broadly classified as 'inertial sensors'.

One known type of inertial sensor, which relies on mode localization, is described in WO2011/148137. The sensor comprises two identical (or near identical) resonators, weakly mechanically coupled to one another, and which are driven to vibrate. The sensor is configured such that changes in an input measurand modulates the stiffness of only one of the resonators. A stiffness modulation of one of the resonators in response to the input measurand results in changes to the modal response of the coupled resonators. In particular, there is a change in the eigenstates of the vibrational modes (which relates to the relative amplitudes of the resonators, at the resonant frequencies measured for each of the modes of vibration). Eigenstate variations are functions of the input measurand and so changes in eigenstate variations can be used to measure an input measurand.

The sensitivity of such a sensor depends on the degree to which the eigenstates change in response to an input measurand. This is dependent on the coupling strength (i.e. the stiffness of the coupling) between the two resonators. As the coupling strength decreases, the degree to which the eigenstates change in response to a change in the input measurand increases. Provided the stiffness of the coupling between the two resonators is less than half the stiffness of one of the resonators, the sensitivity of an inertial sensor configured to detect changes in mode localization will be greater than an inertial sensor configured to detect changes in resonant frequency.

While inertial sensors measuring changes in eigenstates have many advantages over inertial sensors directly measuring a resonant frequency shift, there is still a limit placed on the sensitivity and resolution of such sensors. The sensitivity or resolution of such an inertial sensor can be represented by a scale factor which is a constant of proportionality in the relationship between the change in the ratio of the amplitudes of oscillation of the first and second resonator and the change in the input measurand. Minimizing the coupling strength between the resonators maximizes the scale factor of the sensor and so the sensitivity or resolution of the sensor. But, particularly if the inertial sensor is a MEMs device, accurate manufacture of very weak mechanical couplings is difficult. Very weak mechanical couplings are also not robust, so that sensor failure may be a significant problem.

Any errors in the fabrication of the mechanical coupling and the resonators due to limitations of the fabrication process will also result in more extreme mode localization This mode localization becomes more pronounced as the coupling becomes weaker. If the amplitude of oscillation of one of the resonators is several orders of magnitude larger than the other, then the response from the smaller amplitude of oscillation may be lost in the noise of the large amplitude of oscillation. This may render measuring the amplitude, and so measuring the change in amplitude in response to changes in an input measurand, difficult or impossible. Therefore, a limit is placed on the minimum weakness of coupling that can be used and so the maximum sensitivity of the inertial sensor. This is particularly true for MEMs inertial sensors.

Another example of an inertial sensor that relies on comparing the energy in two coupled modes of vibration is a gyroscope comprising a single axisymmetric disc resonator that can vibrate in two orthogonal modes. There are two principle axes of elasticity defined in the resonator, orthogonal to one another. A first mode of vibration is driven in one of these axes. Coupling between the first mode and a second orthogonal mode occurs due to the Coriolis effect. Changes in the rotation of the sensor may result in a change in the Coriolis force experienced, which results in a change to magnitude of the coupling between the two modes. Such inertial sensors suffer the same limitations in sensitivity as those of two mechanically coupled resonators. Inaccuracies in manufacturing or defects within the materials used lead to reduced sensor sensitivity.

It would be desirable to improve the sensitivity of sensors that rely on coupling between different vibrational modes.

SUMMARY OF THE INVENTION

The invention provides an inertial sensor, a method of inertial sensing using the inertial sensor, a method of tuning the inertial sensor and a method of inertial sensing. The invention is defined in the appended independent claims, to which reference should be made. Preferred or advantageous features of the invention are defined in the dependent claims.

In a first aspect of the invention there is provided an inertial sensor comprising a frame, a resonator assembly fixed to the frame comprising a first and second resonator coupled to one another by a mechanical coupling and a drive means coupled to the resonator assembly for driving the first and second resonators to vibrate. The resonator assembly is configured such that energy is transferred between the first and second resonators through the mechanical coupling. An amount of energy transferred through the mechanical coupling is dependent on the value of an input measurand acting on one of the first and second resonators.

The resonator assembly has a first resonant frequency at which an amplitude of vibration of the first resonator is maximised and a second resonant frequency at which an amplitude of vibration of the second resonator is maximised, when the input measurand has a first value.

The inertial sensor also comprises a pumping means coupled to the resonator assembly for applying a pumping signal to the resonator assembly, the pumping means controlled by electrical circuitry, and a sensor assembly configured to detect the amplitude of oscillation of the first resonator at the first resonant frequency and the amplitude of oscillation of the second resonator at the second resonant frequency.

The electrical circuitry is configured to control the pumping means to apply a pumping signal that has a frequency substantially equal to a difference between the first resonant frequency and the second resonant frequency. When the input measurand has the first value, the signal from the pumping means adjusts an amplitude ratio of the amplitudes of oscillation of the first and second resonator detected by the sensor assembly so that the amplitude ratio is within a predetermined amplitude ratio range over an expected range of input measurand values. An output of the inertial sensor is based on the amplitude ratio.

The output being "based on the amplitude ratio" is intended to cover both a first arrangement, in which the sensor is configured to calculate the amplitude ratio from the measured amplitudes and the output is derived from that calculated value, and also a second arrangement, in which the sensor is configured to control the drive signal so as to maintain the amplitude of vibration of one of the resonators at a constant value, for example using a closed loop control arrangement, with the output of the sensor being derived from the measured amplitude of vibration of the other resonator. In the second arrangement, the output is still "based on" the ratio, because the ratio is directly proportional to the measured amplitude of vibration of the other resonator.

As used herein, "substantially equal" in reference to the difference between the first resonant frequency and the second resonant frequency means that the frequency of the pumping signal does not have to be exactly equal to the difference between the first resonant frequency and the second resonant frequency. Advantageously, $0.9|(F_1-F_2)|<F_p<1.1|(F_1-F_2)|$, where $F_p$ is the pumping frequency, $F_1$ is the first resonant frequency and $F_2$ is the second resonant frequency. Advantageously, $F_p \ll F_1$ and $F_2$.

In this context, the sensor assembly being configured to detect the amplitude of oscillation of the second resonator at the second resonant frequency, should be understood to cover the sensor assembly being configured to detect the amplitude of oscillation of the second resonator at a frequency equal to the first resonant frequency plus the frequency of the pumping signal, because this frequency is substantially equal to the second resonant frequency. In practice it may be beneficial to arrange the sensor assembly in this way.

Preferably, the first and second resonators are substantially identical to one another. In other words, the first and second resonators preferably have the same dimensions and material properties and so have substantially the same stiffness when the input measurand has the first value.

The mechanical coupling between the first and second resonators provides a pathway through which the energy between the two resonators can be transferred. The energy from the driving means is shared between the first and second resonator. But the proportion of the energy stored in the first resonator changes as a result of changes in the input measurand.

The sensor assembly advantageously allows the first and second amplitudes of oscillation of the first and second resonators to be detected. The sensor assembly may comprise a capacitive sensor positioned adjacent to the at least one resonator to be sensed.

The first value of the input measurand may be a value that is in the centre of the measurement range for the inertial sensor. For example, the input measurand may be linear acceleration or rotational acceleration. The first value of the input measurand may be the value of the input measurand when the sensor is at rest. In cases where the accelerometer is to be used for measuring the strength of the gravitational field, it may be desirable for the first value of the input measurand to be 0 ms$^{-2}$, or the nominal scalar value of gravity at a specified location.

The inertial sensor may comprise a proof mass suspended from the frame. The first resonator may have a proximal end and a distal end, the first resonator being fixed to the frame at its proximal end and coupled to the proof mass at its distal end. The first resonator may be fixed to the proof mass or may be coupled to the proof mass in some other way, such as by an electrostatic coupling. The second resonator having a proximal end and a distal end, the second resonator being fixed to the frame at its proximal end, adjacent to the first resonator, such that there is no direct coupling between the second resonator and the proof mass. The proof mass may be free to move in a sensing direction, which may be along an axis extending parallel to a straight line between the proximal and distal ends of the first resonator.

Changes in an acceleration experienced by the sensor will result in displacement of the proof mass. The displacement of the proof mass, typically towards or away from the first resonant element, may modulate the stiffness of the first resonator, without altering the stiffness of the second resonator. This change in stiffness results a change to the mode localization.

The relationship between the change in the input measurand and the change in the ratio of amplitudes is advantageously linear, but may be non-linear. The gradient of a linear relationship may be referred to as the scale factor. The higher the scale factor, the greater the change in the ratio of the amplitudes for a change in the input measurand. Inertial sensors with a high scale factor are advantageously more sensitive to changes in the input measurand and have a better resolution.

Applying the pumping signal to the resonator assembly in addition to a drive signal advantageously modulates the stiffness of the first and/or second resonator. This modulation of stiffness is periodic and changes with a frequency equal to the frequency of the pumping signal. The pumping signal having a frequency substantially equal to the difference between the first resonant frequency and the second resonant frequency advantageously modulates the stiffness of resonator assembly in such a way that an additional path of energy transfer between vibrational modes is created, through which phonon populations are transferred between the two vibrational modes. The first resonant frequency corresponds to a first mode of vibration and the second resonant frequency corresponds to a second mode of vibration.

The pumping signal effectively reduces the strength of the coupling between the first and second resonators. A weaker coupling may advantageously result in an inertial sensor with a higher scale factor, and so greater sensitivity or resolution. The scale factor of the inertial sensor with the pumping signal applied may be more than 100 times greater than the inertial sensor without the pumping signal applied. The effective strength of the coupling may advantageously be tuneable, as it depends on the frequency and amplitude of the pumping signal that is used.

Advantageously, the use of a pumping signal allows for high scale factor inertial sensors to be made with relatively strong mechanical couplings. The pumping signal allows for a mechanical coupling with a strength of two orders of magnitude greater for the same scale factor. Such mechanical couplings are advantageously easier to manufacture and have greater fabrication tolerances. Furthermore, the pumping signal may be adjusted to account for, or mitigate, inaccuracies in fabrication and material defects.

The pumping signal therefore allows tuning of the inertial sensor after the sensor has been fabricated to account the limitations of the fabrication of both the coupling between the sensors and the sensors themselves. The tuning is particularly important for MEMs inertial sensors.

When the input measurand has the first value and when the pumping signal is not applied to the resonator assembly, the amplitude of oscillation of the first resonator may be greater than the amplitude of oscillation of the second resonator, when the drive means applies a drive signal at the first resonant frequency. And the amplitude of oscillation of the second resonator may greater than the amplitude of oscillation of the first resonator when the drive means applies a drive signal at the second resonant frequency. This may be due to mode localization resulting from asymmetries in the resonator assembly, as explained. This mode localization becomes more pronounced when weaker mechanical couplings are used. In the extreme case, at the first resonant frequency, the ratio may be higher than 1000. The amplitude of oscillation of the second resonator is then buried in the noise of the first resonator and difficult to detect. Similarly, at the second resonant frequency, the amplitude of vibration of the first resonator may be difficult to measure. This places a limit on the minimum strength of mechanical coupling that can be used. Application of the pumping signal allows for a reduction to the ratio to the predetermined amplitude ratio. Ideally the ratio of amplitudes is between 1 and 20 throughout the expected range of values for the input measurand. In the context of this range of amplitude ratios, the amplitude ratio is taken to be the higher of the amplitude of the first resonator divided by the amplitude of the second resonator and the amplitude of the second resonator divided by the amplitude of the first resonator.

The mechanical coupling between the first and second resonators may be a mechanical linkage coupled to the first resonator at a position between the proximal and distal ends of the first resonator and coupled to the second resonator at a position between the proximal and distal ends of the second resonator. Energy may be transferred between the first and second resonator through the mechanical linkage.

The mechanical linkage may be integrally formed with the first and second resonators. Preferably, the mechanical linkage is positioned at or close to a nodal point of vibration of the resonant elements (i.e. a point of minimum kinetic energy) in the first and/or second mode of vibration.

The inertial sensor may be fabricated from silicon. The inertial sensor may be a micro electrical mechanical systems (MEMS) device.

The electrical circuitry may be connected to the drive means, the pumping means and the sensor assembly. The electrical circuitry may also be connected to the resonator assembly.

The drive means may comprise a capacitive drive means. For example, the drive means may comprise one or more drive electrodes positioned adjacent to the resonator assembly. The drive means may comprise drive circuitry configured to apply an alternating voltage to the one or more drive electrodes. One or more additional electrodes may be fixed to the resonator assembly in opposition to the one or more drive electrodes.

The pumping means may comprise a capacitive pumping means and may operate in the same way as the drive means.

The pumping means may comprise one or more pumping electrodes positioned adjacent to the resonator assembly. The one or more pumping electrodes may be physically separate to the one or drive electrodes. The one or more pumping electrodes may share part or all of the same physical structure as the one or more driving electrodes. For example, a drive signal and a pumping signal may be applied to the resonator assembly through the same electrode. A pumping electrode may be provided adjacent a different one of the resonators to a drive electrode.

The electrical circuitry is preferably configured to apply a DC bias voltage to the resonator assembly.

The sensor assembly may comprise at least one sensor electrode positioned adjacent to each resonator. Motion of each resonator changes the capacitance between the sensor electrode and the associated resonator. The change in capacitance is related to the amplitude of oscillation of the associated resonator.

The inertial sensor may comprise one or more additional electrodes configured to provide a DC bias voltage to the resonator assembly.

The resonators may be double ended tuning fork (DETF) resonators.

In a second aspect of the invention there is provided an inertial sensor comprising a frame, a resonator assembly comprising a first axisymmetric resonator fixed to the frame, a drive means coupled to the resonator assembly for driving the first resonator to vibrate, wherein the first resonator is configured to vibrate in a first mode of vibration with a first resonant frequency when the input measurand has a first value and a second mode of vibration with a second resonant frequency when the input measurand has a first value, and wherein energy is transferred between the first and second modes of vibration, an amount of energy transferred between the modes being dependent on the value of an input measurand, a pumping means coupled to the resonator assembly for applying a pumping signal to the resonator assembly, the pumping means controlled by electrical circuitry, and a sensor assembly configured to detect the amplitude of oscillation of the first mode of vibration and the amplitude of oscillation of the second mode of vibration.

The electrical circuitry is configured to control the pumping means to apply a pumping signal that has a frequency substantially equal to a difference between the first resonant frequency and the second resonant frequency. The pumping signal adjusts an amplitude ratio of the amplitudes of oscillation of the first and second mode of vibration detected by the sensor assembly so that the amplitude ratio is within a predetermined amplitude ratio range over an expected range of input measurand values.

An output of the inertial sensor is based on the amplitude ratio. As in the first aspect, the amplitude of oscillation of one of the modes may be controlled to be constant, and the output of the inertial sensor may be the amplitude of oscillation of the other mode.

The inertial sensor may be a gyroscope. The input measurand may be angular velocity, the magnitude of the Coriolis force affecting the amount of energy transferred between the first and second modes of vibration. The input measurand may be angular velocity. The first value of the input measurand may be 0 rad s$^{-1}$.

The sensor assembly may comprise capacitive sensors positioned adjacent to the at least one resonator.

The drive means may comprise at least one drive electrode configured to apply a time-varying potential difference to the resonator assembly, the drive means being configured to apply a time-varying potential difference to the at least one drive electrode.

The pumping means may comprise at least one pumping electrode. The pumping signal may be a time-varying potential difference applied to the at least one pumping electrode.

The inertial sensor may be a micro-electro-mechanical system systems (MEMS) device. The inertial sensor may be constructed from silicon.

The axes of the inertial sensor, through which the first and second modes of vibration act, preferably have identical stiffness. However, there tends to be a stiffness mismatch as a result of the tolerances of the fabrication process and material anisotropy. The resonator may comprise an axisymmetric disc resonator wherein the axisymmetric disc resonator is fixed to the frame through at least three separate anchor points. Limitations in the manufacture process may result in the disc resonator not being entirely axisymmetric and so the axes may have a stiffness mismatch. The stiffness mismatch may also be due to material anisotropy. Applying the pumping signal to the resonator assembly advantageously modulates the stiffness of the resonator assembly in one or both of the axes. This modulation of stiffness may be periodic and change with a frequency equal to the frequency of the pumping signal. The pumping signal having a frequency substantially equal to the difference between the first resonant frequency and the second resonant frequency may advantageously modulate the stiffness of resonator assembly in such a way that the energy transfer between the two modes is maximised and effective mode-matching can be achieved. This improves coupling between the two modes and so increases the sensitivity of the inertial sensor. The pumping signal therefore allows tuning of the inertial sensor after the sensor has been fabricated to account the limitations of the fabrication.

In a third aspect of the invention there is provided a method of tuning the inertial sensor of the first or second aspect of the invention comprising the steps of:
  driving the resonator assembly by applying a drive signal to the drive means;
  sensing a first amplitude of oscillation of a resonator of the resonator assembly at a first frequency and a second amplitude of oscillation of a resonator of the resonator assembly at a second frequency;
  additionally driving the resonator assembly with an initial pumping signal having a frequency substantially equal to the difference between the first frequency and the second frequency,
  determining a ratio of the first amplitude of oscillation and the second amplitude of oscillation when the at least one resonator is being driven by the initial pumping signal, and
  iteratively adjusting the amplitude and/or the frequency of the initial pumping signal until the ratio is equal to a predetermined value.

In a fourth aspect of the invention there is provided a method of inertial sensing using a resonator assembly comprising at least one resonator, the resonator assembly having a first mode of vibration having a first resonant frequency and a second mode of vibration having a second resonant frequency when an input measurand is equal to a first value, comprising the steps of:
  driving the resonator assembly with a drive signal and a pump signal;
  sensing a first amplitude of oscillation of a resonator of the resonator assembly at the first resonant frequency and a second amplitude of oscillation of a resonator of the resonator assembly at the second resonant frequency;
  wherein the pump signal has a frequency substantially equal to a difference between the first resonant frequency and the second resonant frequency, the pump signal adjusting a ratio between the sensed first and second amplitudes of oscillation so that the amplitude ratio is within a predetermined amplitude ratio range over an expected range of input measurand values; and
  providing an output signal based on changes in the ratio of sensed amplitudes of oscillation resulting from changes in the input measurand.

The ratio between the first and second amplitudes of oscillation may be reduced to a predetermined amplitude ratio of between 1 to 20, and preferably approximately equal to 1, when the input measurand is equal to zero.

The step of providing an output signal may comprise the step of calculating the ratio between the first and second amplitudes of oscillation.

The resonator assembly may comprise a first resonator and a second resonator mechanically coupled to one another and wherein an amount of energy is transferred between two a first mode of vibration and a second mode of vibrations changes as a result of changes in the value of an input measurand.

The first amplitude of oscillation may be the amplitude of oscillation of the first resonator and the second amplitude of oscillation may be the amplitude of oscillation of the second resonator.

The resonator assembly may comprise a first resonator configured to vibrate in a plurality of vibrational modes and an amount of energy transferred between two modes may change as a result of changes in the value of an input measurand.

The first amplitude of oscillation may be the amplitude of oscillation of a first mode of vibration in the first resonator and the second amplitude of oscillation may be the amplitude of oscillation of a second mode of vibration in the first resonator The first mode of vibration may be orthogonal to the second mode of vibration.

It should be clear that features described in relation to one aspect of the invention may be applied to other aspects of the invention.

BRIEF DESCRIPTION OF THE DRAWINGS

Embodiments of the invention will now be described in detail, by way of example only, with reference to the accompanying drawings, in which.

DETAILED DESCRIPTION

Figure 1A:
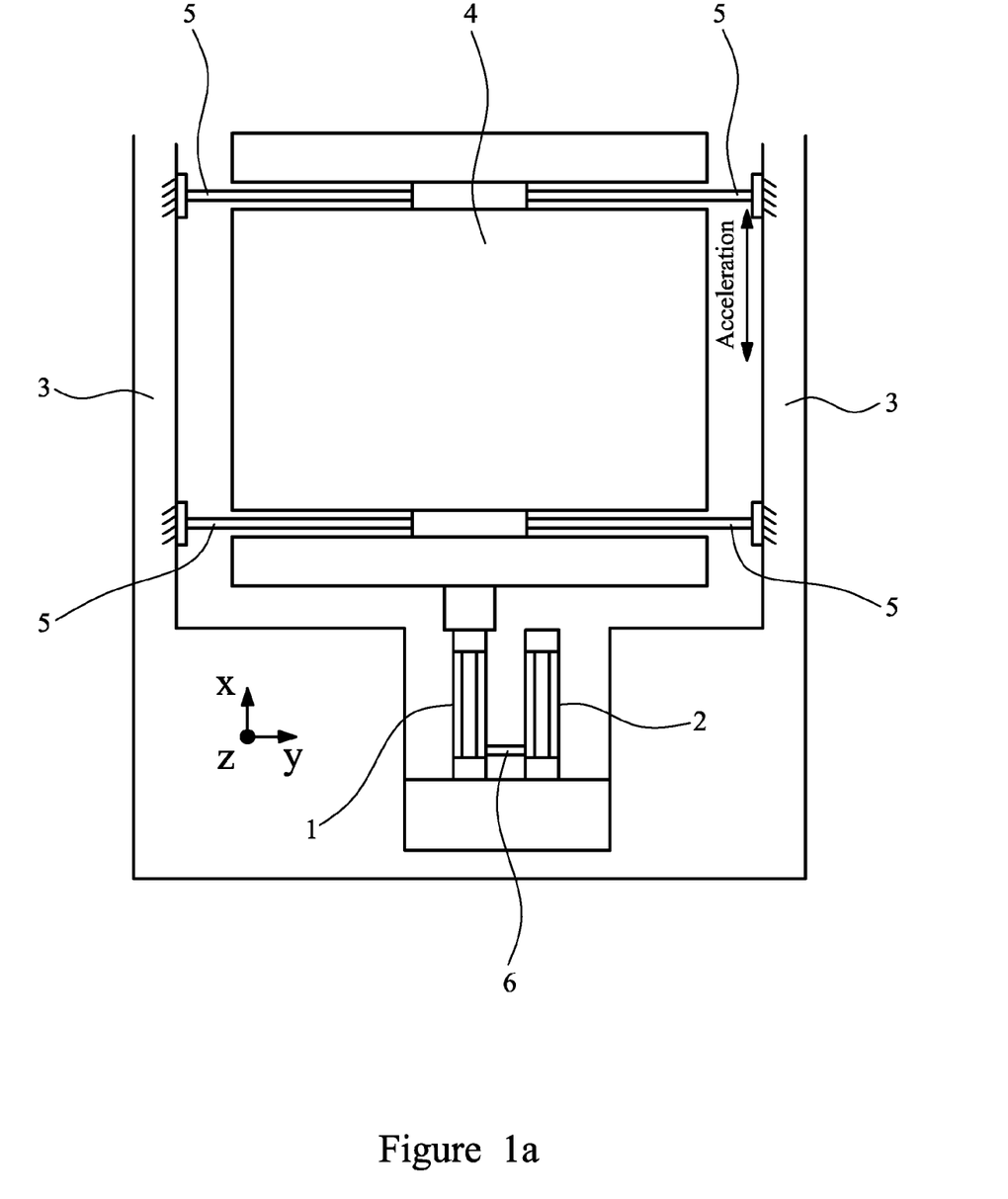
FIG. 1a is a schematic view of an inertial sensor in accordance with the invention wherein the resonator assembly comprises first and second resonators mechanically coupled together.

FIG. 1a illustrates an inertial sensor in accordance with the present invention. The inertial sensor comprises an resonator assembly comprising two resonant elements 1, 2, which in this example are double ended tuning forks (DETFs). The two resonant elements 1, 2 are adjacent to one another and fixed to a substrate or frame 3. The first resonant element 1 is fixed to a proof mass 4, which is suspended from the frame by flexures 5. The two resonant elements are weakly coupled by a mechanical coupling element 6. The resonator assembly is driven to vibrate by a drive means such that the first resonator 1 vibrates with a first amplitude of oscillation and the second resonator 2 vibrates with a second amplitude of oscillation. Energy from one resonator is transferred to the other through the mechanical coupling 6. The resonator assembly is also driven with a pumping signal. The amplitude of oscillation of each of the resonators is sensed. The circuitry used for driving and sensing the vibrations of the resonant elements and for applying the pumping signal is not shown in FIG. 1a, but is explained in more detail below and in relation to FIG. 2.

Mode localization in a device of this type may be illustrated by considering the simple case of two weakly coupled resonators with masses $m_1$ and $m_2$ and stiffnesses $k_1$ and $k_2$. One of the resonators is connected to a proof mass. When the two resonators are perfectly identical ($m_1=m_2=m$; $k_1=k_2=k$) the system is symmetric about the coupling, which has a stiffness $k_c$. The relative shift in the eigenstates due to a strain modulated change in stiffness of the resonator connected to the proof mass of ($\Delta k$) is given by:

$$\frac{\Delta u}{u^0} \simeq \frac{\Delta k}{4k_c}. \quad (1)$$

A detailed explanation of mode localization in this type of system can be found in "Enhancing Parametric Sensitivity in Electrically Coupled MEMS Resonators" by Pradyumna Thiruvenkatanathan et al. Journal of Microelectromechanical Systems, Vol. 18, No. 5, October 2009. Comparing equation (1) with the conventional approach of measuring a relative shift in the resonant frequency (equation (2) below), it can be observed that for any value of $k_c<(k/2)$, the relative shift in the eigenstate is greater than that of the resonant frequency:

$$\frac{\Delta f}{f^0} \simeq \frac{\Delta k}{2k} \quad (2)$$

The critical dependence of parametric sensitivity on the strength of internal coupling ($k_c$) can be exploited to enhance the performance and in effect, the resolution of such sensors.

Furthermore, since the eigenstates are deduced from the amplitudes of vibration of both the coupled resonators at the eigenvalues, any effects on the stiffness due to ambient environmental fluctuations (e.g. temperature) affect both the identical resonators to the same extent, thereby leading to a common mode cancellation of these effects to the first order. However, any changes in the stiffness on one of the resonators relative to the other (differential mode), leads to significant shifts in the eigenstates under conditions of weak internal coupling as expressed in equation (1). Such a common mode rejection capability enables the realization of inertial sensors that are orders of magnitude more sensitive to the measurand alone without employing any active/passive control or compensation techniques, making this form of sensing particularly attractive over the more conventional resonant frequency based sensing approach.

Figure 1B:
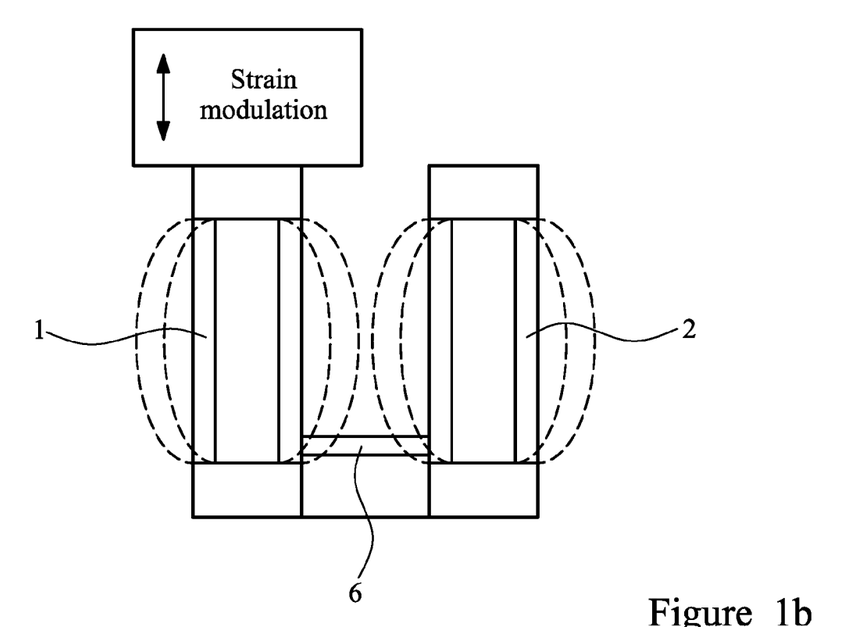
FIG. 1b is a schematic view of the resonator assembly of FIG. 1a, showing the resonator assembly vibrating.

The features and operation of the sensor in FIG. 1a will now be described in more detail. The first and second resonators 1, 2 are shown in more detail in FIG. 1b and are silicon DETF elements, each comprising two tines. The resonators 1,2 are identical to within manufacturing tolerances. The coupling element 6 is also formed of silicon. The dotted lines in FIG. 1b illustrate the vibration of the tines of each element.

The mechanical coupling is located towards the base of the first and second resonators, i.e. close to the frame 3. The reason for this is that the potential energy contribution is largest near the base of the first and second resonators, so that the mechanical coupling in that position mimics the behaviour of a spring without adding any additional mass to the system. So the mechanical coupling under such conditions can be modelled as a spring alone.

Strain modulation on the first resonant element 1 applied by the accelerating proof mass 4 in the drive direction modifies the effective stiffness of the first resonant element 1. This leads to a localisation of the vibrational energy in one or other of the resonating elements 1,2, as explained above. The amplitude of oscillation of each of the resonating elements is measured and the amplitude ratio calculated to provide an output indicative of the acceleration on the proof mass.

The sensor of FIG. 1a is advantageously fabricated entirely from a single semiconductor wafer, such as a silicon-on-insulator (SOI) wafer and can be fabricated using convention MEMS fabrication techniques, such as etching. This includes the frame 3, the resonant elements 1, 2, the proof mass 4, and the flexures 5.

Figure 2:
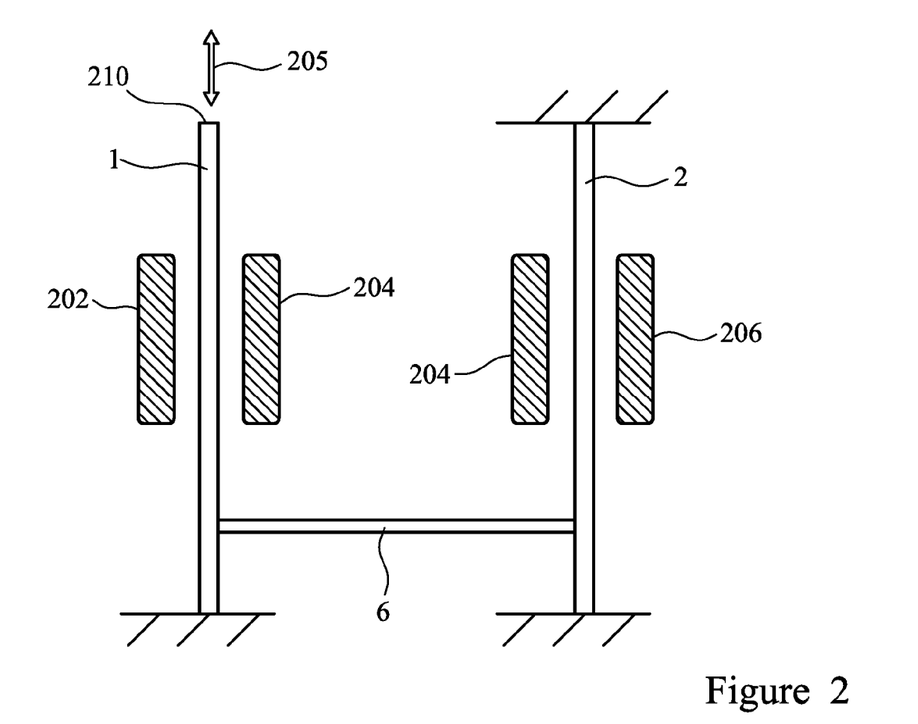
FIG. 2 is a schematic view of resonator assembly of FIG. 1a, showing the electrodes used to drive, sense and pump the resonator assembly.

FIG. 2 shows a schematic of the resonating elements 1,2 together with driving electrode 202 for driving two modes of vibration in the resonating elements 1,2. FIG. 2 also shows the sensing electrodes 204 for sensing said modes of vibration. The arrow 205 shows the direction that acceleration is detected in by the sensor and surface 210 represents the point of contact between the first resonator 1 and the proof mass, which is not shown. The sensor further comprises control circuitry which is not shown.

The drive electrode 202 is used to apply an alternating drive voltage to first resonator 1. A phase locked loop is used to lock the frequency of the drive voltage to a first resonant frequency corresponding a first mode of vibration, in which the amplitude of vibration of the first resonant element is maximised. Energy from the first mode of vibration is transferred to the second resonating element 2 through the mechanical coupling 6. This causes the second resonating element to vibrate. In some embodiments, the sensor comprises further drive electrodes. These may be positioned to drive the first or second resonating elements with a drive signal having the same frequency as that applied by the first drive electrode 202 and having either a 0° or 180° phase difference.

The sensing electrodes 204 are configured to measure the amplitudes of the first and second resonant elements 1,2. Sensing of the amplitude of vibration is achieved by detecting a change in capacitance resulting from movement of the resonant elements towards and away from the electrodes. The amplitude of vibration of the first resonant element is measured at the first resonant frequency. The amplitude of the second resonant element is detected at the second resonant frequency at which the amplitude of vibration of the first resonant element is maximised. In practice the second resonant frequency is determined as the first resonant frequency plus the frequency of the pumping signal applied, as explained below. As explained, the ratio of the detected amplitudes is a measure of the acceleration experience by the proof mass. If the drive signal is controlled to maintain the amplitude of vibration of the first resonator at a constant amplitude, then the amplitude of the second resonant element may be used as the measure of acceleration.

Figure 3:
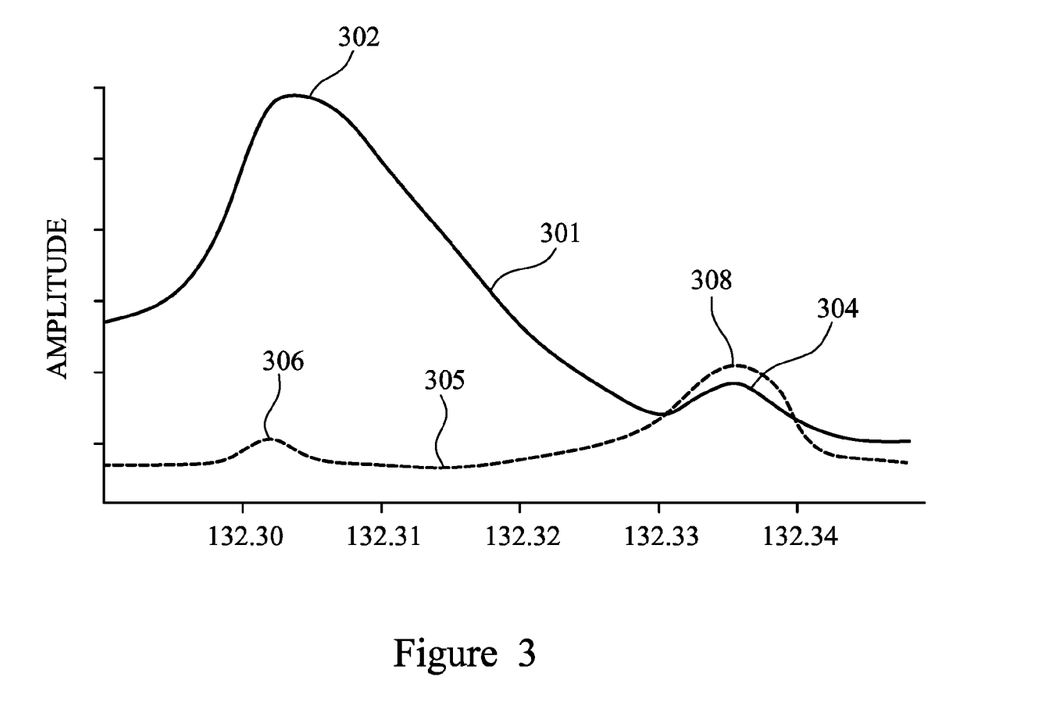
FIG. 3 is a graph showing the response of the first resonator and second resonator being driven at various frequencies and without a pumping signal.

The coupling between the first and second resonators affects the scale factor of the inertial sensor, which is the degree of change in the eigenstates of the resonator assembly with changes in the input measurand. The weaker the coupling strength, the greater the scale factor and so the higher the sensitivity of the sensor. FIG. 3 shows the response of a resonator assembly of the type shown in FIG. 1 when the stiffness of coupling between the first and second resonator $k_c \ll k$. For the plot of FIG. 3, no pumping signal is applied to the resonator assembly.

In FIG. 3 line 301 is the response of the first resonator and line 305 is the response of the second resonator. There are two amplitude peaks 302, 304 for the first resonator, corresponding to two resonant modes of vibration when the input acceleration is zero. Peak 302 represents the first resonant frequency at which the first resonator 1 has a maximum amplitude. Peak 304 represents the resonant frequency of the second resonant mode. Similarly the second resonator has two resonant peaks, peak 306 at the first resonant frequency and peak 308 and the second resonant frequency. As a measure of acceleration, the control circuitry calculates the ratio of the amplitude of peak 302 to peak 308.

It can be seen that the first resonant peak 302 of the first resonator is much larger than the second resonant peak 308 of the second resonator. This may be due to asymmetries in the coupling between the resonators or between the resonators themselves. This problem is acute when using very weak mechanical couplings because manufacturing tolerances are so small. In practice, when subject to acceleration, the mode localisation would become more severe, leading to amplitude ratios above several thousand. In that case, the smaller peak, peak 308, would be lost in noise.

The inertial sensor could be tuned by using a DC bias voltage applied to one of the resonators to reduce the amplitude ratio, but this has several disadvantages, such as drift and noise in the DC source, as well as leading to pull-in instability of the resonator.

Applying a pumping signal to the resonator assembly via the pumping electrode 206, as shown in FIG. 2 allows for both the use of stronger mechanical coupling for a given sensitivity and also tuning of the amplitude ratio between the modes at the desired operating point.

The pumping signal has an amplitude and frequency chosen such that a path of energy localization is created between the two resonators. The energy redistribution between the two resonators is more pronounced than when using only mechanical coupling, as the pumping signal effectively weakens the coupling between the first and second resonators. So the mechanical coupling may be fabricated to be several orders of magnitude stronger than the hypothetical case of FIG. 3 while not compromising the scale factor.

Figure 4:
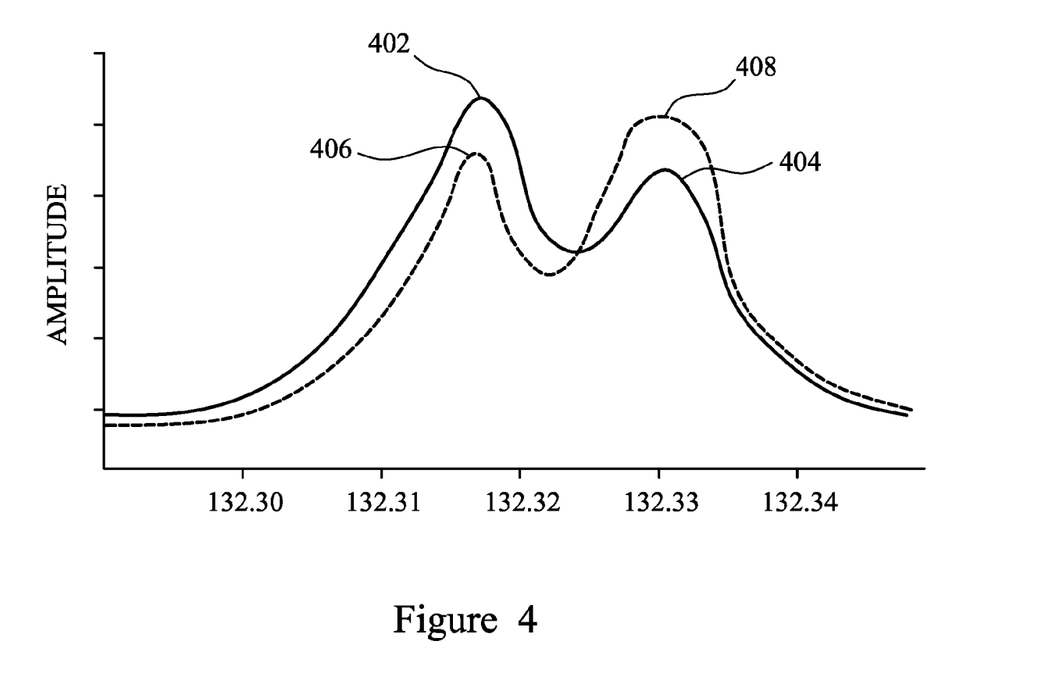
FIG. 4 is a graph showing the response of the first resonator and second resonator with a pumping signal tuned to minimize mode localization.

FIG. 4 shows the response of a resonator assembly comprising two coupled resonators where the mechanical coupling is two orders of magnitude stronger than in the resonator assembly of FIG. 3. A pumping signal is applied to the resonator assembly with a frequency and amplitude tuned such that mode localization is minimized when the input acceleration is zero. Peak 402 represents the amplitude of the first resonator at the first resonant frequency and peak 404 represents the amplitude of first resonator at the second resonant frequency. Peak 406 represents the amplitude of the second resonator at the first resonant frequency and peak 408 represents the amplitude of second resonator at the second resonant frequency. It can be seen that the amplitude ratio between peak 402 and peak 408 is much smaller than that between peak 302 and 308. So the response peak with the lower amplitude will not be lost in noise. The frequencies of the two resonant frequencies are also closer compared to the system of FIG. 3, as the stiffness modulation caused by the pumping signal accounts for the stiffness mismatches between the two resonators.

Figure 5:
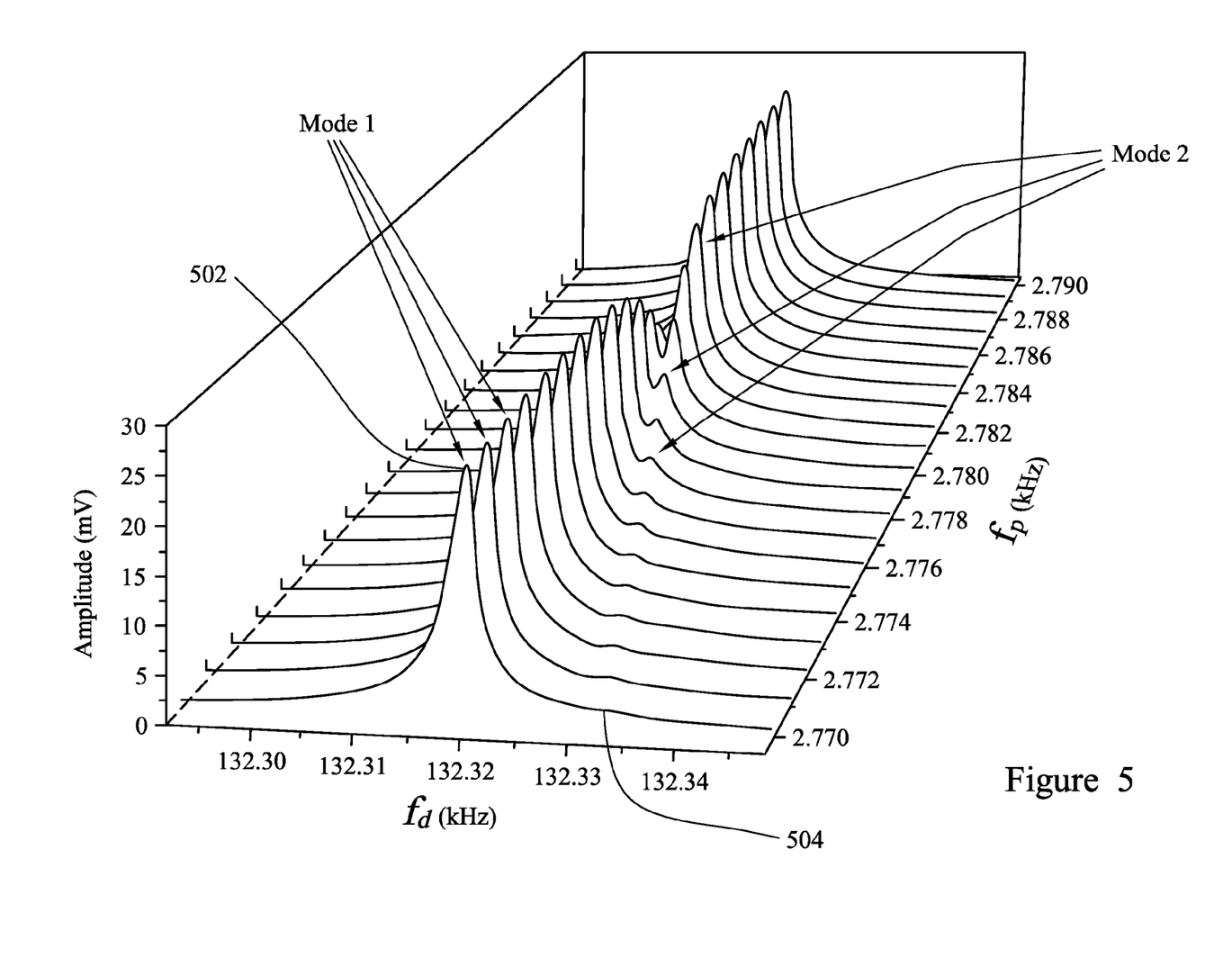
FIG. 5 is a series of graphs showing how the response of the first resonator changes with pumping frequency.

FIG. 5 shows how the response of the first resonator changes with the tuning of the frequency of the pumping signal. FIG. 5 shows the measured open loop frequency response of the first resonator. It can be seen that as the frequency of the pumping signal increases across a narrow range, the response of the first resonator to different drive frequencies significantly changes. Initially the first resonator has a large response at a first resonant frequency corresponding to a first mode of vibration. As the pumping signal increases, the response at the first resonant frequency reduces and the response at a second resonant frequency, corresponding to a second mode of vibration, increases. So by altering the frequency of the pumping signal, the relative amplitudes of vibration in the first and second modes can be adjusted.

Figure 6:
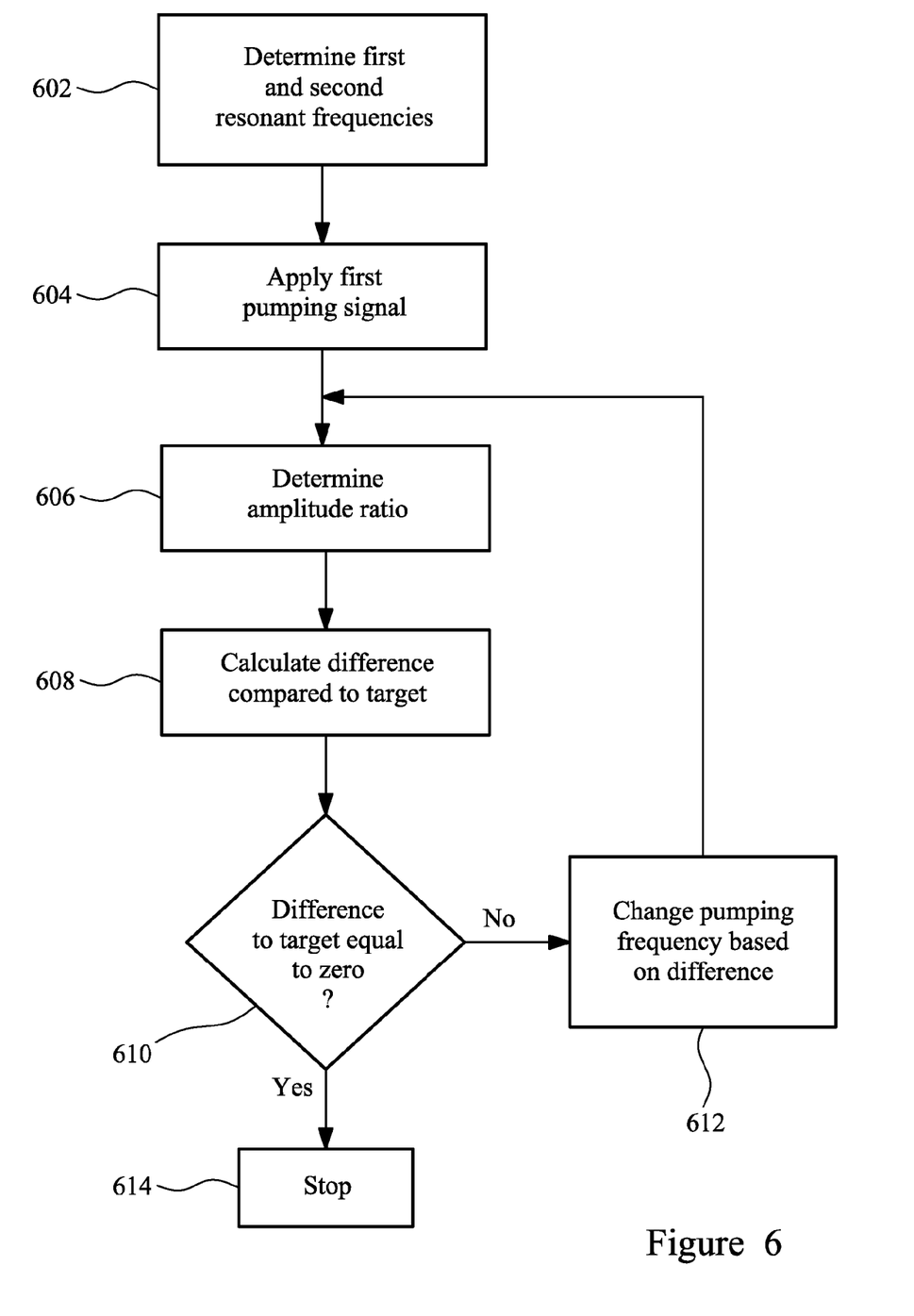
FIG. 6 is a flow diagram showing a method of tuning the pumping frequency to achieve a target amplitude ratio.

An example tuning method is shown in FIG. 6. At step 602 the drive assembly applies a range of frequencies to the resonator assembly. The sense assembly measures the response of the first and second resonators at each frequency to determine the resonant frequencies. The input measurand may be zero, or may be another value in the centre of a range of expected input measurand values during operation. FIG. 3 shows the kind of response that might be expected.

At step 604, a first pumping signal is applied to the resonator assembly. The first pumping signal has a frequency equal to the difference between the detected first and second resonant frequencies. The amplitude of the pumping frequency is experimentally determined to set the inter-modal coupling strength and optimise energy transfer between the resonators or modes.

At step 606 the amplitude ratio of the first resonator at the first resonant frequency and the second resonator at the second resonant frequency is calculated. At step 608 and 610 the calculated amplitude ratio is compared to a target amplitude ratio. The target amplitude ratio may be between 1 and 20, but it is typically desirable for it to be between 1 and 3.

If the difference between the amplitude ratio and the target ratio is not equal to zero, then step 612 is performed. The pumping frequency is changed by a small amount and the steps 606 to 610 are repeated. In the first iteration, the pumping frequency is increased. For each subsequent iteration, the direction of the change is chosen by comparing the difference between the ratio and the target ratio of the previous iteration with the difference in the current iteration. If the difference is higher in the current iteration then the change should be to decrease the pumping frequency. If the difference is lower in the current iteration then the pumping frequency should continue to be increased. The iterations are repeated until step 614 is reached and the difference between the amplitude ratio and the target ratio is equal to zero.

So by appropriate tuning of the pumping signal, not only can the sensitivity of the inertial sensor be improved, but also the operational bandwidth of the sensor can be adjusted. By ensuring that the amplitude ratio is not extreme over a desired operating range, the output signal can be accurately obtained. Further, the background seismic noise coupled into the sensor can be rejected by the intrinsic filtering properties of the scheme.

Figure 7:
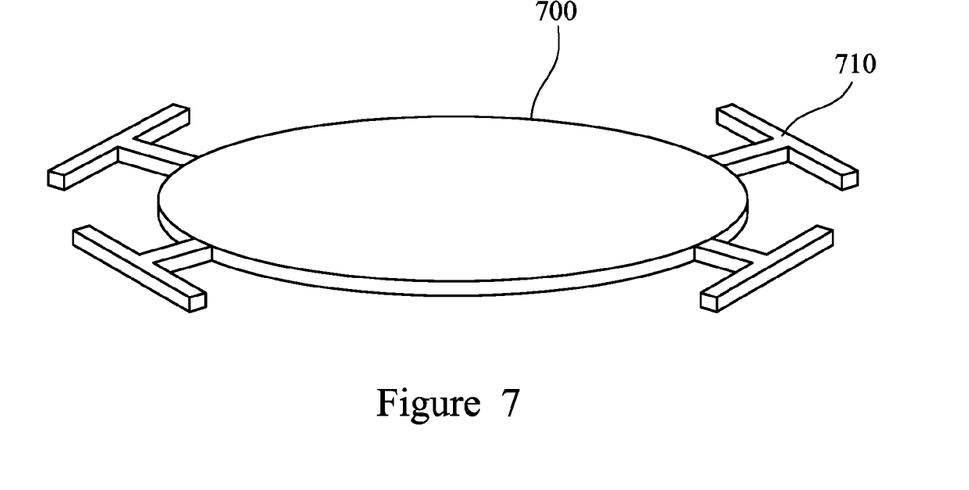
FIG. 7 is a schematic perspective view of an edge anchored disc resonator that can be used in a gyroscope in accordance with the invention.

There are other types of inertial sensor that rely on energy transfer between different modes of vibration, and to which the same principle of a parametric pumping signal can be beneficially applied. One such inertial sensor is shown in FIG. 7, and is described in WO2018/138529. FIG. 7 is a schematic perspective view of an edge anchored disc resonator that can be used in a MEMS silicon gyroscope. The disc 700 is circular and has a radius of 750 µm. The disc 700 is 25 µm thick. The disc 700 is formed from a single crystal of silicon. The disc 700 is suspended from a frame (not shown) by four T shaped anchors or flexures 710.

A disc resonator as shown in FIG. 7 can be driven in different vibrational modes by exciting the disc. The disc can be driven to vibrate in different modes by electrodes adjacent to the disc and adjusting a voltage between the disc and the electrodes. By maintaining the disc at a ground voltage and applying a time varying voltage to one or more electrodes adjacent to the disc, a time varying electrostatic force is applied to the disc, causing it to vibrate. Different modes can be excited depending on the frequency of the drive force and depending on the shape of the disc and position of the anchors, as well as the material properties of the disc and the position of the drive electrodes.

Figure 8:
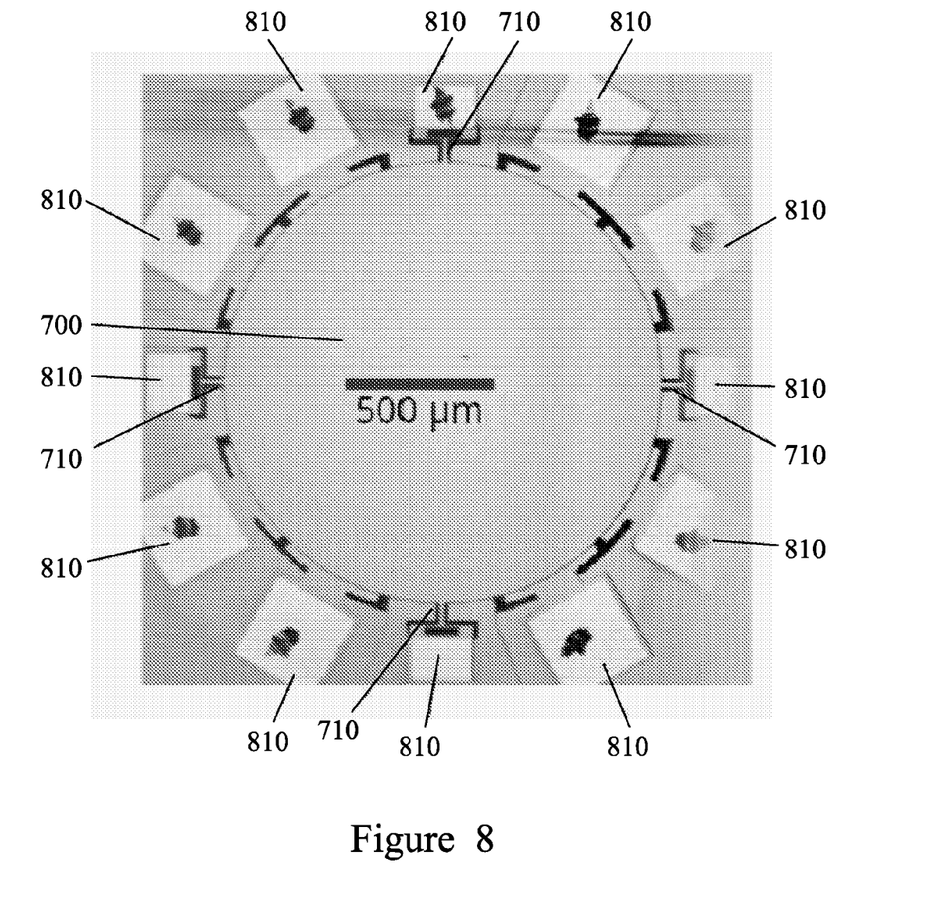
FIG. 8 is a plan view of a gyroscope comprising an edge anchored disc resonator of the type shown in FIG. 7, with twelve electrodes arranged around its circumference.

FIG. 8 is a micrograph of a disc resonator of the type shown in FIG. 7. FIG. 8 also shows 12 electrodes equally spaced around the periphery of the disc. The electrodes 810 are used to drive the disc into a particular mode of vibration and to sense the vibration of the disc. An electrode is provided at the location of each of the anchors 710. In this embodiment the anchors are aligned with the <110> direction of the silicon crystal. Additional electrodes are provided between the anchors. A contact pad for each electrode is deposited on the frame to allow for the bonding of leads to each electrode.

For use as a gyroscope, it is desirable to have two orthogonal modes (Mode A and Mode B) that are matched in resonant frequency. With the arrangement shown, with 12 electrodes, it is advantageous to operate using third order elliptical modes. There are two orthogonal third order degenerate elliptical modes that can be coupled to one another through the Coriolis force.

Figure 9:
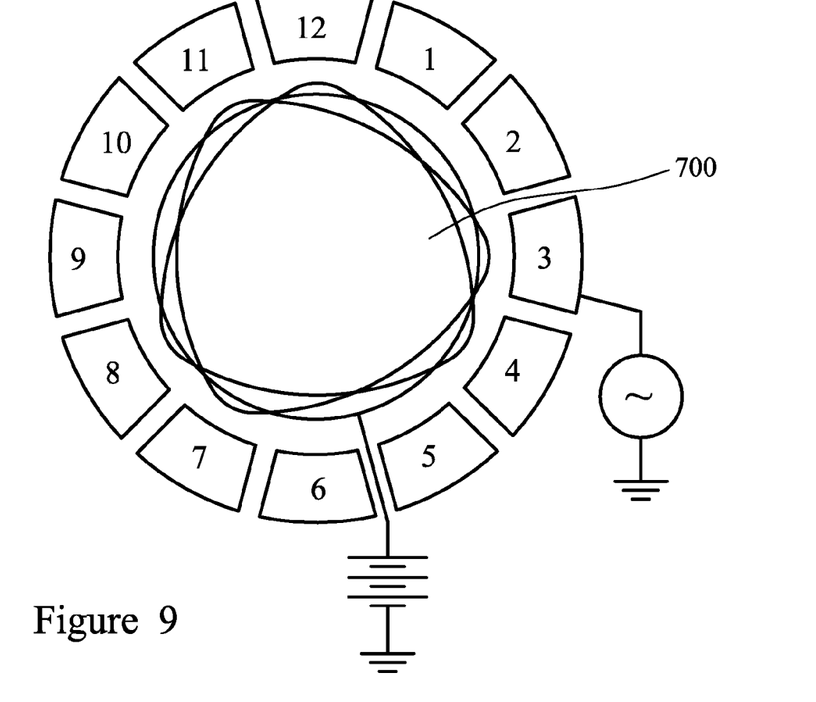
FIG. 9 is a schematic plan view of a gyroscope of the type shown in FIG. 8.

FIG. 9 is a schematic illustration of a disc resonator being excited in two degenerate third order elliptical modes. The disc 700 is surrounded by 12 electrodes, each labelled with a port number from 1 to 12. An oscillating voltage is applied to one of the surrounding electrodes and the disc itself is held at a ground potential. The oscillating voltage is a drive signal and the electrode to which it is applied is designated a drive electrode or driving port. The drive signal excites a first of the modes. The second of the modes is excited by coupling from the first of the modes. The modes are essentially trigonal and it can be seen that they are orthogonal to one another.

Figure 10:
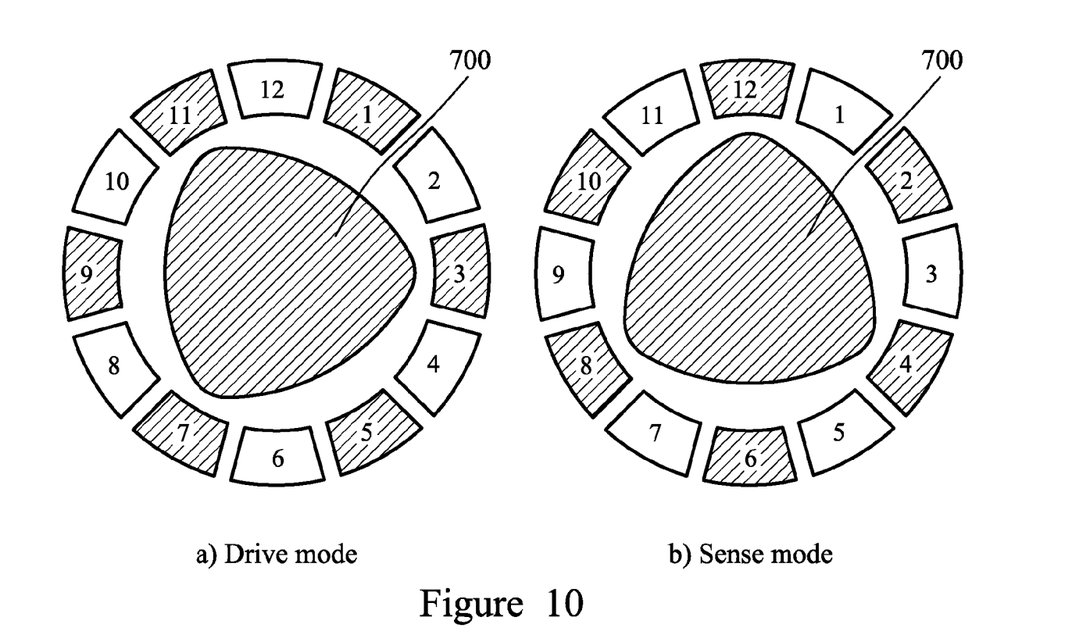
FIG. 10a is a schematic plan view of a gyroscope of the type shown in FIG. 8 illustrating a drive mode of vibration.
FIG. 10b is a schematic plan view of the gyroscope shown in FIG. 10a illustrating a sense mode of vibration.

FIG. 10 shows the modes of FIG. 9 split into drive and sense modes. Each of the surrounding electrodes is given a port number, as in FIG. 9. FIG. 10a illustrates the drive mode, which is the mode excited by the applied voltage. FIG. 10b illustrates the sense mode, which is the mode excited by the Coriolis force coupling from the drive mode.

The input measurand in this case is angular velocity. For a first value of the input measurand the drive mode and sense mode will have a first amplitude. With a change in the input measurand there is a change in the amount of energy transferred between two the two modes. In order to maximise both the drive mode amplitude and the sense mode response, it is advantageous for the modes to operate at resonance. Because the input force from the Coriolis effect acts at the same frequency as the drive mode frequency, it is advantageous for both the drive and sense modes to have the same resonant frequency. In order to maximise the Coriolis coupling, and eliminate cross-axis coupling, it is advantageous that the two modes are exactly orthogonal to one another. However, in practice the two modes are never exactly matched in frequency and orientation because of material imperfections and anisotropy, geometrical imperfections and fabrication tolerances inherent to the manufacturing process, and limitations on the anchoring arrangement that set a limit to the structural symmetry achievable. This results in their being high levels of mode localization when the input measurand has a high value. As in the previous example, this can be difficult to detect and limits the maximum sensitivity of the sensor.

By applying a pumping signal to the resonator a new energy transfer path between the two modes of vibration can be established. The coupling between the two modes can be tuned by selecting particular values for the frequency and amplitude for the pumping signal. This tuning reduces the mode localization due to material imperfections and anisotropy, geometrical imperfections and fabrication tolerances inherent to the manufacturing process, and limitations on the anchoring arrangement that set a limit to the structural symmetry achievable. The electrode or electrodes to which the pumping signal is applied is chosen to be compatible with the particular arrangement used for transducing the sensor response. As in the first embodiment, the frequency of the pumping signal is set to be substantially equal to the difference in frequency between the first mode and the second mode.

The invention claimed is:

1. An inertial sensor comprising:
   a frame,
   a resonator assembly fixed to the frame comprising a first and second resonator coupled to one another by a mechanical coupling,
   a drive means coupled to the resonator assembly for driving the first and second resonators to vibrate, wherein the resonator assembly is configured such that energy is transferred between the first and second resonators through the mechanical coupling, an amount of energy transferred through the mechanical coupling being dependent on a value of an input measurand acting on one of the first and second resonators, and wherein the resonator assembly has a first resonant frequency at which an amplitude of oscillation of the first resonator is maximised and a second resonant frequency at which an amplitude of oscillation of the second resonator is maximised, when the input measurand has a first value;

electrical circuitry to control a pumping means coupled to the resonator assembly for applying a pumping signal to the resonator assembly, and a sensor assembly configured to detect the amplitude of oscillation of the first resonator at the first resonant frequency and the amplitude of oscillation of the second resonator at the second resonant frequency;

wherein the electrical circuitry is configured to control the pumping means to apply a pumping signal that has a frequency substantially equal to a difference between the first resonant frequency and the second resonant frequency;

wherein, when the input measurand has the first value, the signal from the pumping means adjusts an amplitude ratio of the amplitudes of oscillation of the first and second resonator detected by the sensor assembly so that the amplitude ratio is within a predetermined amplitude ratio range over an expected range of input measurand values; and wherein an output of the inertial sensor is based on the amplitude ratio.

2. An inertial sensor according to claim 1, wherein, when the input measurand has the first value and when the pumping signal is not applied to the resonator assembly, the amplitude of oscillation of the first resonator is greater than the amplitude of oscillation of the second resonator when the drive means applies a drive signal at the first resonant frequency and the amplitude of oscillation of the second resonator is greater than the amplitude of oscillation of the first resonator when the drive means applies a drive signal at the second resonant frequency.

3. An inertial sensor according to, claim 1 wherein the first resonator has a proximal end and a distal end, the first resonator being fixed to the frame at its proximal end and coupled to a proof mass at its distal end; and wherein the second resonator has a proximal end and a distal end, the second resonator being fixed to the frame at its proximal end, adjacent to the first resonator, such that there is no direct coupling between the second resonator and the proof mass.

4. An inertial sensor according to claim 3, wherein the mechanical coupling between the first and second resonator is a mechanical linkage coupled to the first resonator at a position between the proximal and distal ends of the first resonator and coupled to the second resonator at a position between the proximal and distal ends of the second resonator.

5. An inertial sensor according to claim 1 wherein the mechanical linkage is integrally formed with the first and second resonators.

6. An inertial sensor according to claim 1, wherein the amplitude ratio, when the pumping signal is applied and the input measurand has the first value, is between 1 to 20, and preferably approximately equal to 1.

7. An inertial sensor comprising:

a frame, a resonator assembly comprising a first axisymmetric resonator fixed to the frame, a drive means coupled to the resonator assembly for driving the first resonator to vibrate, wherein the first resonator is configured to vibrate in a first mode of vibration with a first resonant frequency when the input measurand has a first value and a second mode of vibration with a second resonant frequency when the input measurand has a first value, and wherein energy is transferred between the first and second modes of vibration, an amount of energy transferred between the modes being dependent on the value of an input measurand, electrical circuitry to control a pumping means coupled to the resonator assembly for applying a pumping signal to the resonator assembly and a sensor assembly configured to detect an amplitude of oscillation of the first mode of vibration and an amplitude of oscillation of the second mode of vibration;

wherein the electrical circuitry is configured to control the pumping means to apply a pumping signal that has a frequency substantially equal to a difference between the first resonant frequency and the second resonant frequency;

wherein the signal from the pumping means reduces an amplitude ratio of the amplitudes of oscillation of the first and second mode of vibration detected by the sensor assembly so that the amplitude ratio is within a predetermined amplitude ratio range over an expected range of input measurand values; and wherein an output of the inertial sensor is based on the amplitude ratio.

8. An inertial sensor according to claim 7, wherein the first resonator comprises an axisymmetric disc resonator and wherein the axisymmetric disc resonator is fixed to the frame through at least three separate anchor points.

9. An inertial sensor according to claim 7, wherein the first mode of vibration is orthogonal to the second mode of vibration.

10. An inertial sensor according to claim 7, wherein the amplitude ratio, when the pumping signal is applied and the input measurand has the first value, is between 1 to 20, and preferably approximately equal to 1.

11. An inertial sensor according to claim 7, wherein the drive means comprises at least one drive electrode configured to apply a drive signal to the resonator assembly, the drive means being configured to apply a time-varying potential difference to the at least one drive electrode.

12. An inertial sensor according to claim 7, wherein the pumping means comprises at least one pumping electrode, the pumping signal being a time-varying potential difference applied to the at least one pumping electrode.

13. An inertial sensor according to claim 7, wherein the sensor assembly comprises at least one sensor electrode positioned adjacent to the resonator assembly.

14. An inertial sensor according to claim 7, wherein the inertial sensor is a micro-electro-mechanical systems (MEMS) device.

15. An inertial sensor according to claim 7, wherein the inertial sensor is formed from silicon.

16. An inertial sensor according to claim 7, wherein the input measurand is acceleration or angular velocity.

17. A method of tuning an inertial sensor comprising the steps of;

driving a resonator assembly comprising at least one resonator by applying a drive signal to drive means coupled to the reasonator assembly;

sensing a first amplitude of oscillation of a resonator of the resonator assembly at a first frequency and a second amplitude of oscillation of a resonator of the resonator assembly at a second frequency;

driving a resonator assembly with an initial pumping signal having a frequency substantially equal to the difference between the first frequency and the second frequency, determining a ratio of the first amplitude of oscillation and the second amplitude of oscillation when the resonator assembly is being driven by the initial pumping signal, and iteratively adjusting the amplitude and/or the frequency of the initial pumping signal until the ratio is equal to a predetermined value.

18. A method of tuning an inertial sensor according to claim 17, wherein the predetermined value is between 1 and 20 when the input measurand is equal to the first value.

19. A method of inertial sensing using a resonator assembly comprising at least one resonator, the resonator assembly having a first mode of vibration having a first resonant frequency and a second mode of vibration having a second resonant frequency when an input measurand is equal to a first value, comprising the steps of:

driving the resonator assembly with a drive signal and a pump signal;

sensing a first amplitude of oscillation of a resonator of the resonator assembly at the first resonant frequency and a second amplitude of oscillation of a resonator of the resonator assembly at the second resonant frequency;

wherein the pump signal has a frequency substantially equal to a difference between the first resonant frequency and the second resonant frequency, the pump signal adjusting a ratio between the sensed first and second amplitudes of oscillation so that the amplitude ratio is within a predetermined amplitude ratio range over an expected range of input measurand values; and providing an output signal based on changes in the ratio of sensed amplitudes of oscillation resulting from changes in the input measurand.

20. A method of inertial sensing according to claim 19, wherein the ratio between the first and second amplitudes of oscillation is between 1 to 20 when the input measurand has the first value.

21. The method of inertial sensing according to claim 19, wherein the step of providing an output signal comprises the step of calculating the ratio between the first and second amplitudes of oscillation.

22. A method of inertial sensing according to claim 19, wherein the resonator assembly comprises a first resonator and a second resonator coupled to one another by a mechanical coupling and wherein the first amplitude of oscillation is the amplitude of oscillation of the first resonator and the second amplitude of oscillation is the amplitude of oscillation of the second resonator.

23. A method of inertial sensing according to claim 19 wherein the resonator assembly comprises a first resonator configured to vibrate in a plurality of vibrational modes and wherein an amount of energy transferred between a first mode of vibration and a second mode of vibration changes as a result of changes in the value of an input measurand and wherein the first amplitude of oscillation is the amplitude of oscillation of the first mode of vibration of the first resonator and the second amplitude of oscillation is the amplitude of oscillation of the second mode of vibration of the first resonator.

* * * * *